United States Patent [19]

Anav et al.

[11] 4,180,476
[45] Dec. 25, 1979

[54] PROCESS FOR THE EXTRACTION OF FISSION PRODUCTS

[75] Inventors: Maurice Anav, Villemoisson sur Orge; André Chesne, Le Vesinet; André Leseur, Fontenay-aux-Roses; Pierre Miquel, Chatillon sous Bagneux; Roger Pascard, Saint Remy les Chevreuse, all of France

[73] Assignee: Commissariat a l'Energie Atomique, Paris, France

[21] Appl. No.: 860,452

[22] Filed: Dec. 14, 1977

[30] Foreign Application Priority Data

Dec. 30, 1976 [FR] France .................................. 76 39569
Oct. 10, 1977 [FR] France .................................. 77 30371

[51] Int. Cl.² .............................................. G21F 9/30
[52] U.S. Cl. ................................. 252/301.1 W; 176/37; 423/2; 423/4; 423/249
[58] Field of Search .................... 252/301.1 W; 423/2, 423/4, 249; 176/37

[56] References Cited

U.S. PATENT DOCUMENTS

| T939,005 | 10/1975 | Enegess | 252/301.1 W |
| 3,282,655 | 11/1966 | Case et al. | 423/4 |
| 3,298,961 | 1/1967 | Davis et al. | 252/301.1 W |
| 3,365,578 | 1/1968 | Grover et al. | 252/301.1 W |

FOREIGN PATENT DOCUMENTS

987014 3/1965 United Kingdom ...................... 176/37

OTHER PUBLICATIONS

Stoller et al, Eds., *Reactor Handbook, vol. II, Fuel Reprocessing*, Interscience Publishers, Inc., New York, 1961, pp. 4, 5, 97, 98.

*Primary Examiner*—Leland A. Sebastian
*Assistant Examiner*—Deborah L. Kyle
*Attorney, Agent, or Firm*—Thomas R. Boland

[57] ABSTRACT

Process for the extraction of fission products contained in irradiated nuclear fuel elements which have been subject to a temperature of at least 1200° C. during their irradiation prior to dissolving the fuel by the wet process. After mechanically treating the elements in order to decan and/or cut them they are brought into contact with water in order to pass the fission products into aqueous solution. The treated elements are then separated from the thus obtained aqueous solution. At least one of the fission products is then recovered from the aqueous solution. The fission products are iodine, cesium, rubidium and tritium.

17 Claims, 2 Drawing Figures

PROCESS FOR THE EXTRACTION OF FISSION PRODUCTS

BACKGROUND OF THE INVENTION

The present invention relates to a process for the extraction of fission products, particularly radioactive iodine, cesium, rubidium and tritium contained in irradiated nuclear fuel elements and more particularly a process permitting the isolation, followed by the recovery of all the radioactive iodine during the initial wet processing operations or irradiated nuclear fuels and more particularly prior to dissolving the fuel of the latter.

Following irradiation nuclear fuel elements contain various fission products which must be isolated and stored because of their potentially harmful activity.

Among these fission products iodine constitutes one of the most harmful elements since it exists in the form of iodine 129 and iodine 131 which are beta gamma emitters. Iodine 129 has the additional disadvantage of being stable on the human scale because its half-life is $17.2 \times 10^6$ years.

Moreover, in irradiated fuel treatment processes utilising a preliminary mechanical decanning or cutting of the fuel followed by dissolving this fuel in a nitric medium, numerous problems are experienced in the recovery of all the radioactive iodine because it escapes from the irradiated fuel in the initial treatment operations. The radioactive iodine is firstly off in the form of traces in the gases of the mechanical decanning or cutting installation for the irradiated fuel, then in very large quantities during nitric dissolving, either in gaseous form or in soluble form in the nitric solution.

Hitherto the extraction and recovery of radioactive iodine have mainly been carried out by treating the gaseous effluents. Such treatments mainly comprise washing the gaseous effluents with an appropriate solution, but they have the disadvantage of leading to large volumes of effluents from which it is often difficult to bring the iodine into a stable and concentrated form with a view to its storage.

Another iodine extraction method has been developed according to which the nitric acid recombined before its recycling is treated in the irradiated fuel dissolving stage in order to desorb most of the iodine contained therein.

It has also been envisaged to treat gaseous effluents by means of silver-charged solid absorbents which permit the obtaining of high retention factors but whose industrial utilisation is only economically practicable for a final trapping for the purpose of holding back the final traces of iodine.

The above treatment methods have the important disadvantage of being unable to ensure the extraction and recovery of all the radioactive iodine present in the irradiated fuels, because they do not make it possible to prevent a certain quantity of iodine from remaining in the nitric dissolving solution when the oxidoreduction conditions prevent the passage of the iodine in the volatile elementary state or when the entrainment conditions of the volatile iodine have not been combined. As a result, this quantity of iodine is then disseminated in the following treatment phases of the irradiated fuels and is finally discharged in an anarchic manner in the plant effluents.

In addition, such methods do not simultaneously ensure an extraction of the radioactive cesium, rubidium and tritium which are also present in the irradiated fuels.

BRIEF SUMMARY OF THE INVENTION

The present invention relates to a process which obviates the disadvantages indicated hereinbefore because it not only ensures a simultaneous extraction of all the iodine and most of the cesium, rubidium and tritium from irradiated elements which have been subjected to a temperature of at least 1200° C. during irradiation, but it also ensures an easy recovery of all the iodine with a view to its long-term storage.

Furthermore the process according to the invention applies more particularly to highly irradiated fuel elements, for example fuel elements from fast neutron reactors.

According to the invention, the process for the extraction of fission products which have been subjected to a temperature of at least 1200° C. during their irradiation, prior to dissolving the fuel by the wet process is characterised in that after mechanically treating said elements in order to decan and/or cut them the treated elements are brought into contact with water so that the fission products pass into an aqueous solution, the treated elements are then separated from the thus obtained aqueous solution and at least one of the said fission products is recovered from this aqueous solution.

According to the invention the fission products are iodine, cesium, rubidium and tritium and at least the iodine is recovered from this aqueous solution.

According to the invention the treated elements are brought into contact with water at a temperature between 20° and 100° C. and preferably at a temperature close to 100° C.

The above-defined process has the particular advantage of making it possible to ensure by treatment with water a simultaneous extraction of all the iodine and most of the cesium, rubidium and tritium contained in irradiated nuclear fuel elements prior to dissolving the latter, thus making it impossible for the radioactive iodine to be given off during the subsequent processing stages of the irradiated fuel elements.

The elimination of most of the radioactive cesium, rubidium and tritium also decreases the radioactivity of the dissolving solution.

Moreover the obtaining by this process of an aqueous solution containing at least 95% of the radioactive iodine present in the irradiated fuels makes it possible to ensure in simple manner the recovery of said radioactive iodine, followed by its treatment in a stable and concentrated form with a view to its long-term storage.

According to another feature of the process of the invention the aqueous solution obtained is clarified by bringing the elements into contact with water prior to recovering at least one of the said fission products from the said aqueous solution in order to avoid the entrainment in the latter of fine fuel particles.

According to another feature of the process of the invention, the treated elements undergo rinsing with water after separating them from the aqueous solution and at least one of the fission products is recovered from the rinsing water.

In this case the aqueous solution obtained during the contacting of the treated elements with water is advantageously concentrated by distillation and the condensed vapour obtained during this distillation is used for the rinsing of the treated elements.

According to the invention, the aqueous solution obtained can be treated in different ways in order to simultaneously or separately recover the various fission products contained therein.

According to a first embodiment of the process of the invention, the radioactive iodine is recovered from the aqueous solution, preferably by precipitation and the aqueous effluents obtained after separating the radioactive iodine are added to the solution for dissolving the fuel.

According to a second embodiment of the process of the invention, the iodine and cesium are successively recovered from the aqueous solution and the aqueous effluents obtained after separating the iodine and cesium are added to the dissolving solution for the said fuel and/or to the rinsing water for the treated elements.

According to a third embodiment of the process certain of the fission products are recovered from the aqueous solution by concentrating it by distillation in order to obtain a concentrate containing the fission products and said concentrate is treated in order to ensure a long-term storage of the fission products, for example by subjecting the concentrate to vitrification or covering with bitumen.

This latter embodiment of the process takes advantage of the fact that radioactive iodine is present in the irradiated fuel in iodide form, for example cesium or rubidium iodide and that these alkaline iodides are very soluble in water and very stable thermally. Moreover rubidium and cesium which may be present in the irradiated fuel without being combined with the iodine form in aqueous solution hydroxides which are also very soluble and thermally very stable, making it possible to obtain a concentrate containing most of the fission products present in the aqueous solution and in particular iodine, cesium and rubidium, whereby they can be directly treated by vitrification or covering with bitumen in order to bring about the long-term storage of iodine. Furthermore due to the thermal stability of alkaline iodides vitrification or covering with bitumen of the concentrates obtained can be effected without there being any liberation of the corresponding halogen.

Moreover, this latter embodiment of the process is advantageous because it does not require the introduction of extraneous elements such as lead or copper for bringing about the recovery of the radioactive iodine and also makes it possible to obviate certain technological difficulties linked with the separation of the precipitates formed, as well as problems caused by the recycling and treatment of precipitation mother liquors.

In the latter embodiment of the process the treated elements separated from the aqueous solution can also be rinsed with water. In this case it is advantageous to use the water vapour obtained during concentration by distillation of the aqueous solution for rinsing the elements.

BRIEF DESCRIPTION OF THE DRAWINGS

A better understanding of the invention will be obtained from reading the following description with reference to a nonlimitative embodiment and the attached drawings, wherein show.

DETAILED DESCRIPTION OF THE PREFERRED EMBODIMENTS

Figure 1:
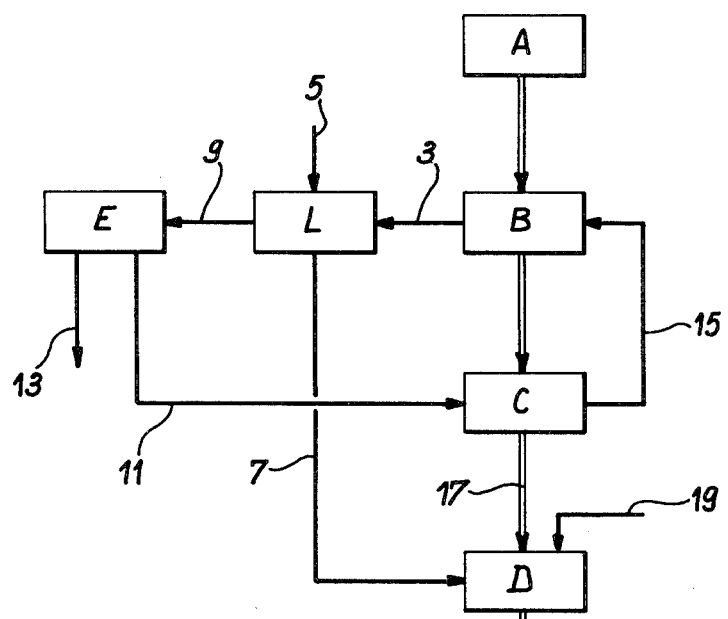
FIG. 1 a diagrammatic representation of an embodiment of the process of the invention.

According to the embodiment of the process illustrated in FIG. 1 the irradiated fuel elements are mechanically treated at A in order to decan and/or cut them. At B the thus treated elements are brought into contact with water. At C the treated elements are rinsed with water. At L the aqueous solution obtained is clarified by bringing the treated elements into contact with water. At E the clarified aqueous solution is concentrated in order to obtain on the one hand water vapour which is recycled after condensation and is used for rinsing the elements at C and on the other the concentrate containing certain of the said fission products which is then removed for treatment with a view to the recovery and/or long-term storage of the latter. The fuel is dissolved at D.

The irradiated fuel elements which during their irradiation have been subject to a temperature of at least 1200° C. are constituted for example by nuclear combustible oxide in a stainless steel can. They are then mechanically treated at A and are for example cut in order to expose part of the nuclear combustible oxide.

This mechanical treatment can also comprise a decanning of the element which makes it possible to expose all the combustible oxide.

During this mechanical treatment a small quantity of radioactive iodine is given off in gaseous form. This quantity represents at the most 0.5% of the quantity of radioactive iodine present in the irradiated fuel.

During tests it has been found that most of the iodine formed in the irradiated fuel is in the iodide state which migrates to the periphery of the element under the action of the irradiation temperature, permitting its passage into aqueous solution on bringing the fuel fragments into contact with water.

The fuel fragments obtained at A are then brought into contact with water at B at a temperature close to boiling point for about two hours so that all the radioactive iodine remaining in the irradiated fuel is passed into the water. During this water treatment most of the water-soluble fission products such as radioactive tritium, rubidium and cesium included in the fuel also pass into the aqueous solution, the quantity of cesium representing at least 80% of the total cesium contained in the irradiated fuel.

The aqueous solution separated from the fuel fragments is brought (line 3) to L to be clarified whilst the fragments are brought to C to be rinsed with water. The aqueous solution separated from the fuel fragments is for example clarified by passing through a filter which holds back the fine nuclear fuel particles optionally entrained in the aqueous solution, the latter being subsequently recovered for example by means of topping up with pure water (line 5) and are then added to the fuel fragments (line 7) when they are dissolved at D.

Obviously the fine particles recovered could be recycled by topping up with pure water at rinsing stage C of the fuel fragments rather than at dissolving stage D, or at rinsing stage C and at dissolving stage D.

The clarified aqueous solution is then brought (line 9) to E and is then concentrated by distillation, for example in an evaporator. On leaving the evaporator the distillate constituted by tritiated water is recycled after condensation (line 11) at C and is then used for rinsing the fuel fragments.

The concentrate obtained during this distillation, which contains most of the fission products, particularly iodine, cesium and rubidium, is discharged (line 13) to a treatment installation in which there is either a long-term storage of the fission products or a recovery of the iodine and possibly the cesium.

In this embodiment of the process the water used at C for rinsing the fuel fragments is recycled at B (line 15) to be used for the bringing into contact of fuel fragments and water.

Thus, for the successive treatment of a plurality of charges of fuel fragments taken individually the water used for rinsing one charge is used for the contacting of the following charge with water. In the same way for the successive treatment of a plurality of charges of fuel fragments taken individually the condensed water vapour from concentration stage E of the clarified aqueous solution obtained by bringing a charge into contact with water is used for rinsing the preceding charge at C.

Following rinsing the fuel fragments are then brought (line 17) to D where they are dissolved for example by means of nitric acid (line 19).

Preferably the aqueous solution is concentrated in such a way that a concentrate is obtained which can immediately be treated to ensure the long-term storage of the fission products. In this case the concentrate removed by line 13 for example directly undergoes a vitrification or bitumen covering treatment.

However, in certain cases it may be advantageous to concentrate the aqueous solution in such a way that a concentrate is obtained which can then be treated to separately recover the iodine and optionally the cesium.

The radioactive iodine can for example be recovered from the concentrate by precipitation by introducing into the concentrate an appropriate reagent such as a metallic nitrate, e.g. copper nitrate or lead nitrate so as to precipitate a copper iodide or lead iodide. Preferably lead nitrate is used. The iodide precipitate is separated by filtering and then treated for example by vitrification with a view to its long-term storage. The effluents obtained after separating the iodide precipitate still contain radioactive cesium and one part of tritium, the other part of tritium having been given off in the form of tritiated water vapour during the concentration of the aqueous solution at E and recycled at C (line 11) for rinsing. These effluents can be recycled at D and then added to the nitric solution for dissolving the fuel, the nitric acid having been supplied by line 19.

In the same way the cesium can be recovered from the concentrate after recovering the iodine. In this case the effluents obtained after separating the radioactive iodine are treated with a view to the separation of the cesium and in particular the radioactive cesium contained therein. After separating this cesium the effluents obtained are recycled in the fuel dissolving stage and then added to the nitric dissolving solution. These effluents can also be partly recycled at C for use in the rinsing of the irradiated fuel fragments.

The cesium can be separated by precipitation by means of appropriate reagents. However, this separation is preferably effected by concentrating by evaporation the effluents obtained after separating the iodine in such a way that a concentrate of cesium, tritium and the tritiated water vapour is obtained which, after condensation, can be recycled at C for rinsing the irradiated fuel fragments and/or at D to be added to the solution for dissolving the irradiated fuel. The concentrate of cesium and tritium obtained can then undergo a vitrification treatment in order to ensure the long-term storage of the cesium and tritium.

In all cases analysis of the effluents recycled at D shows that they no longer contain radioactive iodine.

According to the invention the stages of treatment with water, rinsing and dissolving the mechanically treated fuel elements can be performed in separate containers into which the elements are successively transferred. However, it is preferable to carry out in the same container the water treatment of the fuel fragments, followed by their rinsing with water.

Figure 2:
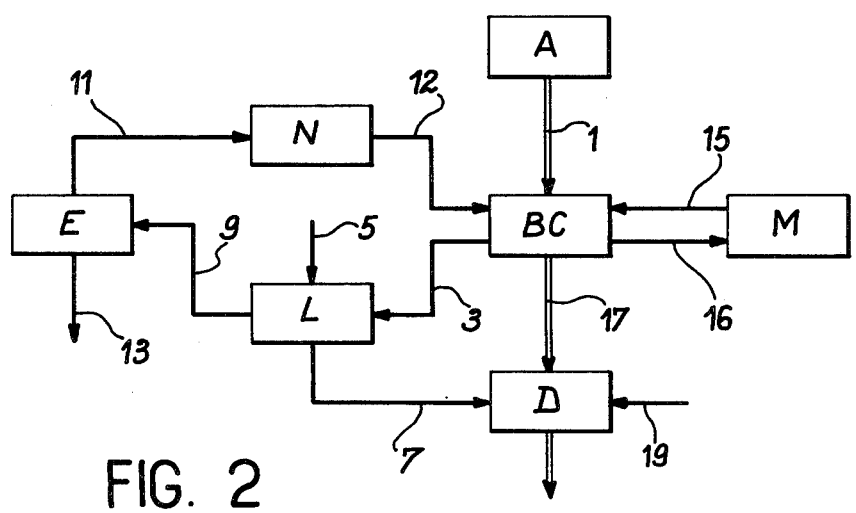
FIG. 2 a variant of the embodiment of the process of the invention shown in FIG. 1.

FIG. 2 shows a variant of the embodiment of the process of the invention illustrated in FIG. 1 which is particularly directed at the successive treatment of a plurality of fuel fragment charges and the performance in the same container of the stages of contacting and rinsing a fuel fragment charge with water. In FIG. 2 the same references are used for designating the stages of the process shown in FIG. 1.

In this second embodiment a fuel fragment charge from installation A at which mechanical cutting and/or decanning is performed is supplied (line 1) to BC where in the same container the fuel fragment charge is brought into contact with water and is then rinsed with water.

For bringing this charge into contact with water water stored in the rinsing vessel M is fed to BC (line 15). After an adequate contacting period the aqueous solution obtained is discharged to L (line 3) in order to clarify the same and then to E (line 9) in order to concentrate it by distillation as hereinbefore.

The water vapour obtained during this distillation is discharged (line 11) after condensing in a storage vessel N, whilst the concentrate is discharged (line 13) as hereinbefore to a treatment installation where the long-term storage of the fission products is effected.

This charge is then rinsed by supplying the water stored in vessel N to BC (line 12). After rinsing the fuel fragment charge is removed (line 17) to dissolver D, whilst the water used for rinsing is discharged (line 16) to storage vessel M.

According to this embodiment of the process the water used for rinsing a fuel fragment charge is stored in rinsing vessel M and is then used for contacting the following charge with water. In the same way the distillate produced during the concentration of the aqueous solution obtained by contacting a charge with water is stored after condensation in storage vessel N and is then used for rinsing the following fuel fragment charge.

This second embodiment of the process is particularly advantageous because by effecting the bringing into contact of the fuel fragments with water and then their rinsing with water in the same container the problems linked with the transfer of the fuel to several successive containers are obviated.

In addition, all these treatments can be performed in the dissolver. However, in the latter case it is necessary to ensure a perfect washing of the dissolver and its complete emptying after each treatment involving bringing the charge into contact with water.

Hereinafter the results obtained during the treatment by the process of the invention of four batches of nuclear fuel elements, which differ from one another by their combustion rates and by the duration of their cooling prior to treatment. In each batch the fuel of the elements is $UO_2$–$PUO_2$ and each element contains 12 g of plutonium and 29 g of uranium.

In these tests the elements were cut and then brought into contact with water at a temperature of 90° C. for two hours. Analysis of the aqueous solution obtained gave the resulsts in the following table.

Similar tests with a contact period of 30 minutes gave equivalent resulst.

It is obvious that the process of the invention ensures a substantially complete extraction of the radioactive iodine present in the fuel.

The invention is not limited to the embodiments described and represented hereinbefore and various modifications can be made thereto without passing beyond the scope of the invention.

TABLE

| $UO_2$- $PuO_2$ fuel needles | Batch I | Batch II | Batch III | Batch IV |
|---|---|---|---|---|
| Combustion rate in MW/d/tonne | 69,000 | 79,500 | 96,000 | 102,000 |
| Cooling time in months | 43 | 22 | 20 | 16 |
| Iodine quantity extracted by water treatment in mg | 25.4 | 30.5 | 29.8 | 30 |
| $CS_{134}$ and $CS_{137}$ quantities extracted by water treatment in Curies | 9.2 | | 13.5 | 12 |
| % of iodine extracted compared with the iodine quantity present in the fuel | more than 99% | more than 99% | more than 99% | more than 99% |
| % of cesium extracted compared with the cesium quantity present in the fuel | 80% | | more than 95% | more than 95% |

What is claimed is:

1. A process for the extraction of fission products from irradiated nuclear fuel elements which have been subject to a temperature of at least 1200° C. during their irradiation, comprising the steps of:
   (a) mechanically treating said irradiated fuel elements in order to decan and/or cut them;
   (b) contacting the mechanically treated fuel elements with water to obtain an aqueous solution containing soluble fission products;
   (c) separating the treated fuel elements from the thus obtained solution; and
   (d) recovering at least one of said fission products from the separated solution.

2. A process according to claim 1, wherein the fission products are iodine, cesium, rubidium and tritium and wherein at least the iodine is recovered from the separated aqueous solution.

3. A process according to claim 2, wherein the iodine is recovered from the separated aqueous solution.

4. A process according to claim 2, wherein iodine and cesium are successively recovered from the separated aqueous solution.

5. A process according to claim 2, wherein the iodine is recovered from the aqueous solution by precipitating by means of a metallic nitrate.

6. A process according to claim 5, wherein the metallic nitrate is chosen from the group consisting of nitrate and copper nitrate.

7. A process according to claim 2, wherein the iodine is recovered from the aqueous solution and the cesium and part of the tritium are then recovered by concentrating by evaporation the effluents obtained after separating the iodine for obtaining a concentrate of cesium, tritium, and tritiated water vapor.

8. A process according to claim 1, wherein in step (b) the treated fuel elements are brought into contact with water at a temperature between 20° C. and 100° C.

9. A process according to claim 1, which comprises clarifying the aqueous solution separated from the treated fuel elements before recovering at least one of the fission products.

10. A process according to claim 1 which comprises rinsing with water the treated fuel elements separated from the thus obtained aqueous solution and recovering at least one of the fission products from the water used for rinsing purposes.

11. A process according to claim 10, which comprises concentrating by distillation the thus obtained aqueous solution, condensing the vapor obtained during this distillation, and using it to rinse the treated fuel elements.

12. A process according to claim 10, wherein the steps of contacting the treated fuel elements with water and rinsing said fuel elements with water are performed successively on a plurality of charges of the treated fuel elements, each charge being taken individually and the water used for rinsing one of the charges being used for contacting the following charge with water.

13. A process according to claim 1, which comprises the steps of clarifying the aqueous solution separated from said elements, concentrating this aqueous solution by distillation in order to obtain a concentrate containing certain of the fission products and treating this concentrate in order to ensure a long-term storage of the fission products.

14. A process according to claim 13, which comprises condensing the water vapor obtained during said distillation using this condensed vapor for rinsing the treated elements and recovering certain of the fission products from the water used for rinsing purposes.

15. A process according to claim 14, wherein the steps of contacting the treated fuel elements with water and rinsing said fuel elements with water are performed successively on a plurality of charges of the treated fuel elements, each charge being taken individually and the water used for rinsing one of the charges being used for contacting the following charge with water.

16. A process according to claim 13, wherein the concentrate is treated by vitrification in order to ensure the long-term storage of the fission products.

17. A process according to claim 13, wherein the concentrate is treated by covering with bitumen to ensure the long-term storage of the fission products.

* * * * *